(12) United States Patent
Kaneko et al.

(10) Patent No.: US 9,868,370 B2
(45) Date of Patent: Jan. 16, 2018

(54) SEATBACK FRAME STRUCTURE

(71) Applicant: TOYOTA JIDOSHA KABUSHIKI KAISHA, Toyota-shi (JP)

(72) Inventors: Akira Kaneko, Toyota (JP); Hiroshi Tamura, Toyota (JP); Takuya Ishikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 150 days.

(21) Appl. No.: 14/915,570

(22) PCT Filed: Aug. 26, 2014

(86) PCT No.: PCT/IB2014/001621
§ 371 (c)(1),
(2) Date: Feb. 29, 2016

(87) PCT Pub. No.: WO2015/028867
PCT Pub. Date: Mar. 5, 2015

(65) Prior Publication Data
US 2016/0207425 A1 Jul. 21, 2016

(30) Foreign Application Priority Data
Aug. 29, 2013 (JP) ................. 2013-178170

(51) Int. Cl.
*B60N 2/22* (2006.01)
*B60N 2/68* (2006.01)
*B60N 2/20* (2006.01)

(52) U.S. Cl.
CPC ............ *B60N 2/2227* (2013.01); *B60N 2/20* (2013.01); *B60N 2/22* (2013.01); *B60N 2/68* (2013.01); *B60N 2/682* (2013.01)

(58) Field of Classification Search
None
See application file for complete search history.

(56) References Cited

U.S. PATENT DOCUMENTS 6,045,190 A * 4/2000 Ward ...................... B60N 2/20
                                                               297/376
7,070,236 B2 * 7/2006 Kawashima ......... B60N 2/4228
                                                               297/216.1

(Continued)

FOREIGN PATENT DOCUMENTS

JP       11-032865 A     2/1999
JP     2001-514027 A     9/2001
(Continued)

OTHER PUBLICATIONS

International Search Report dated Nov. 18, 2014 in PCT/IB14/01621 Filed Aug. 26, 2014.

*Primary Examiner* — David E Allred
(74) *Attorney, Agent, or Firm* — Oblon, McClelland, Maier & Neustadt, L.L.P.

(57) ABSTRACT

A seatback frame structure includes a reclining mechanism, a joining member that is joined to the reclining mechanism, a fastening member, a seatback frame, and a restricting member. The seatback frame forms a frame of a seatback that can support a back of a seated occupant. The seatback frame is fastened to the joining member by the fastening member. The restricting member includes a restricting portion. The restricting portion is fastened, together with the seatback frame, to the joining member by the fastening member. The restricting portion is configured to restrict relative movement of the seatback frame with respect to the joining member when a vehicle is involved in a rear collision. The seatback frame is made of resin, and the seatback frame is fixed in a state sandwiched by the restricting member and the joining member.

4 Claims, 3 Drawing Sheets

(56) References Cited

U.S. PATENT DOCUMENTS

| | | | |
|---|---|---|---|
| 7,488,035 B2* | 2/2009 | Kawashima | B60N 2/42745 297/216.12 |
| 7,543,877 B2* | 6/2009 | Hanson | B60N 2/24 296/65.16 |
| 2007/0138855 A1 | 6/2007 | Kespohl | |
| 2011/0316320 A1 | 12/2011 | Kulkarni et al. | |
| 2012/0169103 A1 | 7/2012 | Renault et al. | |
| 2014/0252837 A1 | 9/2014 | Yamaguchi et al. | |
| 2015/0097404 A1* | 4/2015 | Furuta | B60N 2/68 297/344.15 |

FOREIGN PATENT DOCUMENTS

| | | |
|---|---|---|
| JP | 2007-161237 A | 6/2007 |
| JP | 2012-232731 A | 11/2012 |
| JP | 2013-010450 A | 1/2013 |
| WO | 99/10196 A1 | 3/1999 |
| WO | 2010/101874 A1 | 9/2010 |
| WO | 2013/089227 A1 | 6/2013 |

* cited by examiner

SEATBACK FRAME STRUCTURE

BACKGROUND OF THE INVENTION

1. Field of the Invention

The invention relates to a seatback frame structure.

2. Description of Related Art

Recently, some seatback frames are being made with resin material (see Japanese Patent Application Publication No. 2007-161237 (JP 2007-161237 A), for example). With a seatback frame made with such resin material as well, when a reclining mechanism is provided on the seatback frame, the seatback frame is fixed by a fastening member such as a bolt to a bracket (a joining member) that is joined to the reclining mechanism.

When a vehicle is involved in a rear collision, a seated occupant moves toward a seat rear side due to inertia force, such that a load toward the seat rear side is input to the seatback frame from the seated occupant. If the load input to the seatback frame is greater than the fastening force by the fastening member between the bracket (i.e., the joining member) and the seatback frame, the seatback frame will move relative to the fastening member. As a result, an inner peripheral portion of a hole in the seatback frame through which the fastening member is inserted may abut against the fastening member, and the load input to the seatback frame may end up concentrating at the inner peripheral portion of this hole, for example. Therefore, it is desirable to reduce the concentration of the load at the fastening portion of the seatback frame.

SUMMARY OF THE INVENTION

The invention thus provides a seatback frame structure capable of reducing the concentration of a load input to a seatback frame when a vehicle is involved in a rear collision, at a fastening portion of a seatback frame to which a joining member is fastened.

A first aspect of the invention relates to a seatback frame structure that includes a reclining mechanism, a joining member that is joined to the reclining mechanism, a fastening member, a seatback frame, and a restricting member. The seatback frame forms a frame of a seatback that can support a back of a seated occupant. The seatback frame is fastened to the joining member by the fastening member. The restricting member includes a restricting portion. The restricting portion is fastened, together with the seatback frame, to the joining member by the fastening member. The restricting portion is configured to restrict relative movement of the seatback frame with respect to the joining member when a vehicle is involved in a rear collision.

With this seatback frame structure, the seatback frame is fastened by the fastening member to the joining member that is joined to the reclining mechanism. Therefore, the seatback frame is connected to the reclining member via the joining member. Also, when the vehicle is involved in a rear collision, the seated occupant moves toward the seat rear side due to inertia force, such that a load is input to the seatback frame from the seated occupant. If at this time the load input to the seatback frame is greater than the fastening force by the fastening member between the seatback frame and the joining member, the seatback frame will try to move relative to the joining member.

Here, the restricting member is fastened, together with the seatback frame, to the joining member by the fastening member. Also, the restricting member includes the restricting portion, and relative movement of the seatback frame with respect to the joining member when the vehicle is involved in a rear collision is restricted by this restricting portion. Therefore, the load input to the seatback frame when the vehicle is involved in a rear collision is input to the restricting member. As a result, concentration of the load that is input to the seatback frame when the vehicle is involved in the rear collision, at the fastening portion of the seatback frame to which the joining member is fastened is able to be reduced.

In the seatback frame structure described above, the seatback frame may be made of resin. The restricting member may include an integrally formed metal collar. The collar may be fastened to the joining member by the fastening member, and the seatback frame may be fixed in a state sandwiched by the restricting member and the joining member.

In the seatback frame structure described above, the restricting member includes a metal collar that is integrally provided on the restricting member. Also, the collar is fastened to the joining member by the fastening member, and the seatback frame is fixed in a state sandwiched by the restricting member and the joining member. As a result, the collar is able to be fastened to the joining member with the fastening member and the collar touching metal to metal by making the fastening member out of metal. Therefore, even if the seatback frame that is made of resin is fastened to the joining member, sufficient axial force by the fastening member is able to be ensured.

In the seatback frame structure described above, the seatback frame may include a flange portion on an outer peripheral portion thereof. A portion of the flange portion may be arranged opposing the restricting portion. Also, the restricting portion may restrict relative movement of the flange portion with respect to the joining member when the vehicle is involved in the rear collision.

In the seatback frame structure described above, the flange portion is formed on an outer peripheral portion of the seatback frame. As a result, the seatback frame is reinforced by the flange portion. Also, a portion of the flange portion is arranged opposing the restricting portion, and relative movement of the flange portion with respect to the joining member when the vehicle is involved in the rear collision is restricted by the restricting portion. As a result, a load that is input to the seatback frame is able to be transmitted to the restricting portion using a portion of the seatback frame that has relatively high strength.

In the seatback frame structure described above, the restricting portion may be adhered to the seatback frame by an adhesive.

In the seatback frame structure described above, the restricting portion is adhered to the seatback frame by the adhesive, so a load input to the seatback frame when the vehicle is involved in a rear collision is able to be better transmitted to the restricting member (i.e., the restricting portion).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
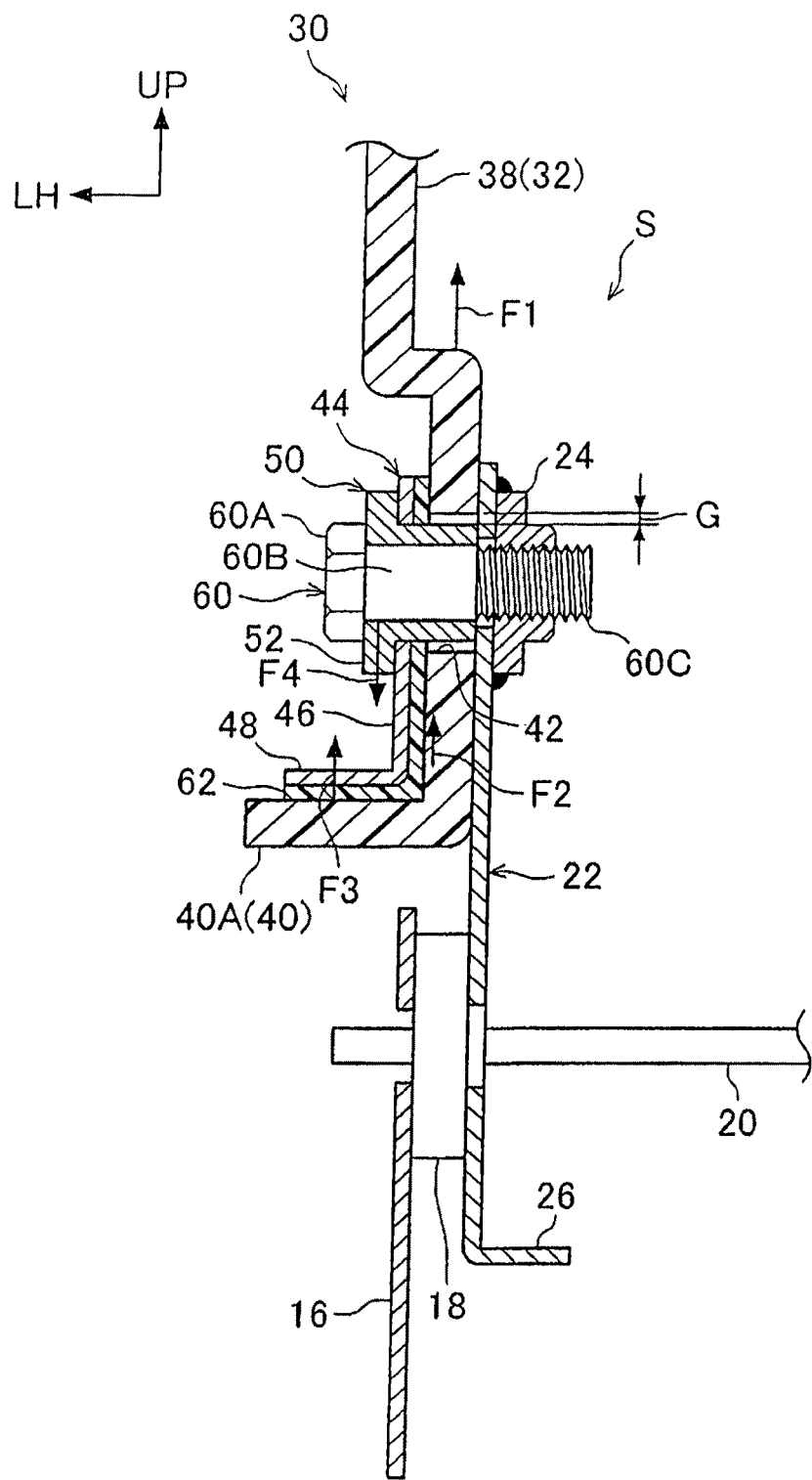
FIG. 1 is a sectional view (a sectional view taken along line I-I in FIG. 3) of the main portions of a vehicle seat to which a seatback frame structure according to one example embodiment of the invention is applied, viewed from a seat rear side.

Hereinafter, a vehicle seat 10 to which a seatback frame structure S according to one example embodiment of the invention is applied will be described with reference to the accompanying drawings. In the drawings, arrow FR indicates a forward direction with respect to the seat, arrow UP indicates an upward direction with respect to the seat, and arrow LH indicates a direction to the left of the seat (one side in a seat width direction). Also, these directions of forward, upward, and left with respect to the seat match the directions of forward, upward, and left, respectively, with respect to a vehicle.

Figure 2:
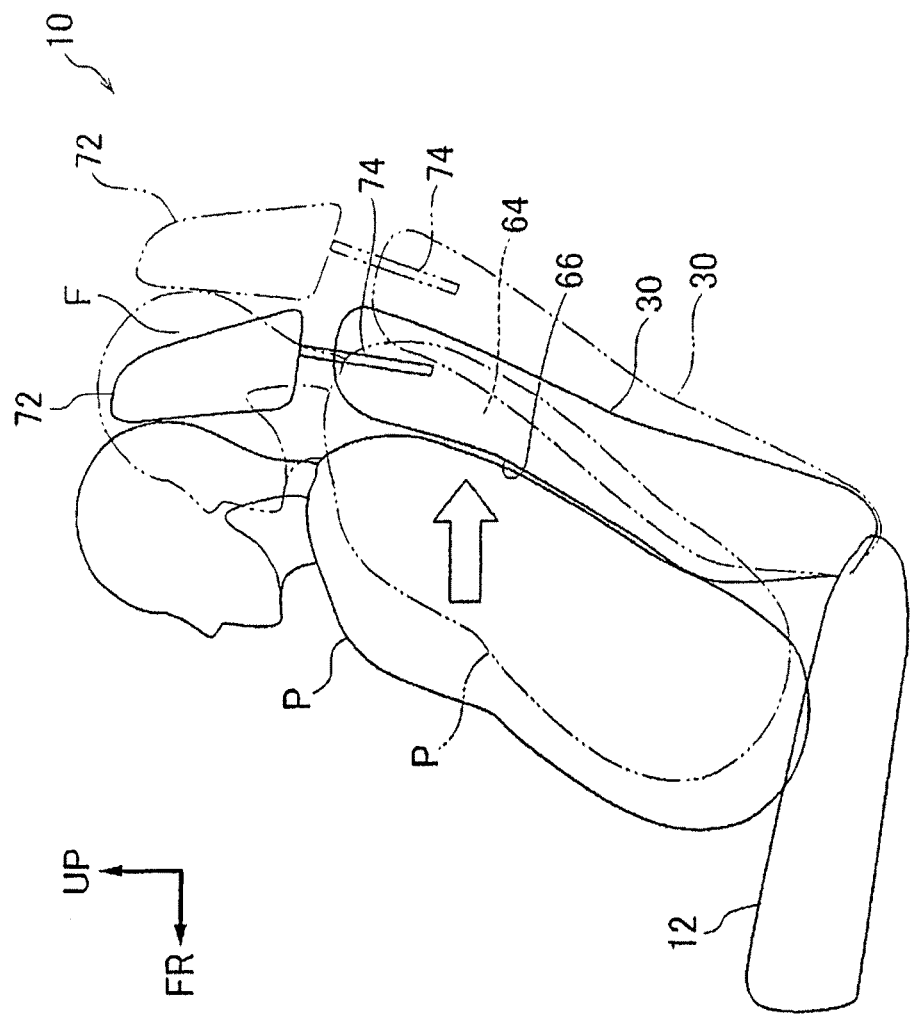
FIG. 2 is a side view of the vehicle seat to which the seatback frame structure according to the example embodiment is applied, viewed from a seat left side.
Figure 3:
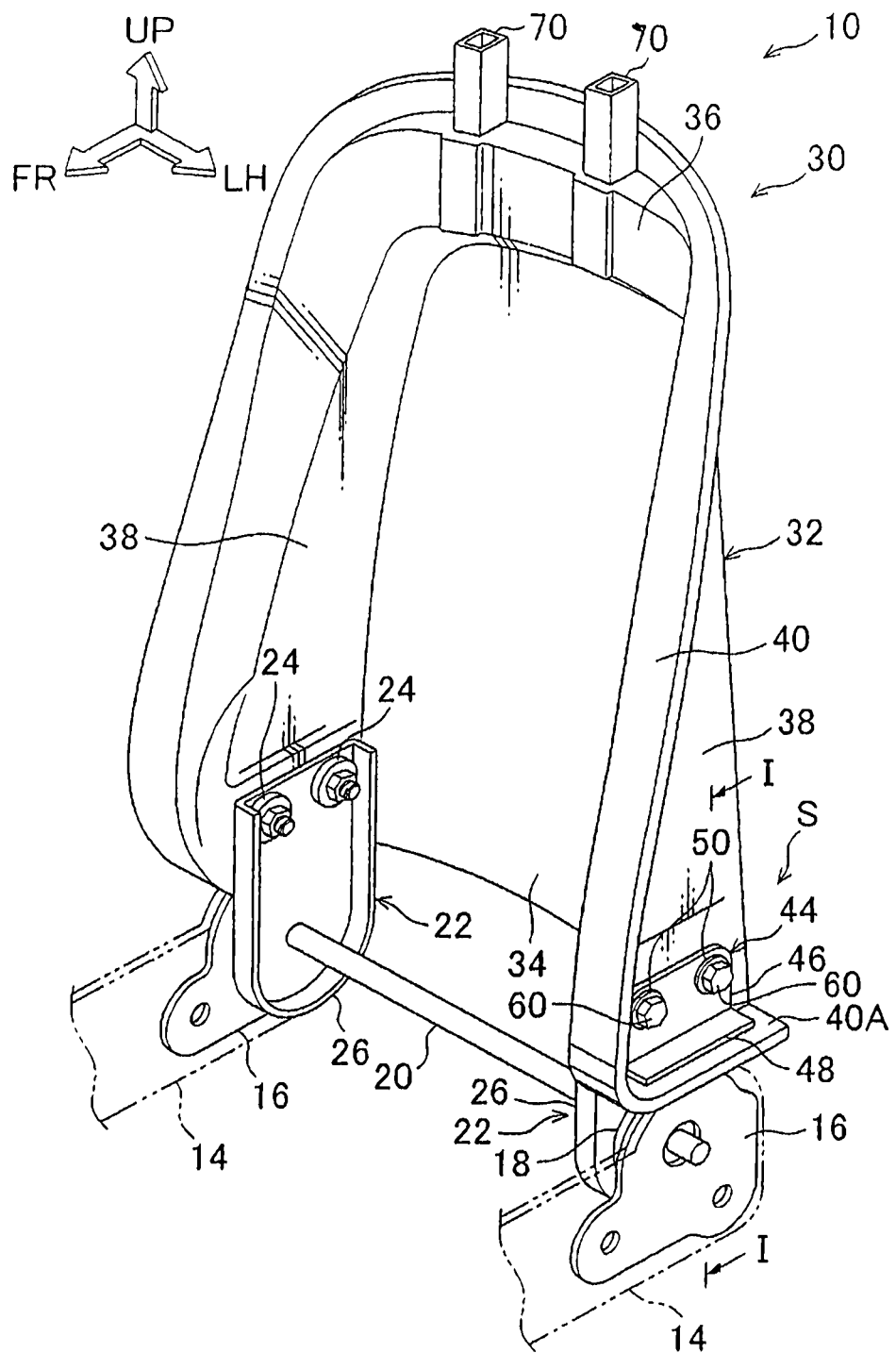
FIG. 3 is a perspective view of the entire seatback frame that forms a frame member of a seatback shown in FIG. 2, viewed at an angle from the left front of the seat.

As shown in FIG. 2, the vehicle seat 10 includes a seat cushion 12 on which an occupant P sits, and a seatback 30 that supports the back of the seated occupant P. As shown in FIG. 3, a pair of seat cushion frames 14 that form a frame of the seat cushion 12 is provided in the seat cushion 12. The seat cushion frames 14 are each formed in a generally long plate shape with a length direction being a seat front-back direction, and are arranged with a plate thickness direction being the seat width direction, on both sides in the seat width direction of the seat cushion 12. Only a rear end portion of the seat cushion frames 14 is shown in FIG. 3.

A plate-shaped hinge bracket 16 is provided on the rear end portion of each of the pair of seat cushion frames 14. The hinge bracket 16 is fastened to the seat cushion frame 14 by a fastening member such as a bolt, not shown, with a plate thickness direction being the seat width direction. Also, a reclining mechanism 18 is fixed to a seat width direction inside surface of each hinge bracket 16 (only the reclining mechanism 18 on the seat left side is shown in FIG. 3). The reclining mechanism 18 is connected by a reclining rod 20 that extends in the seat width direction.

Also, an upper arm 22 that serves as a joining member is provided on the seat width direction inside of each of the pair of reclining mechanisms 18. This upper arm 22 is formed in a generally rectangular plate shape with the length direction being a seat vertical direction, and is arranged with the plate thickness direction being the seat width direction. Also, a lower portion of the upper arm 22 is joined to the reclining mechanism 18 by welding or the like (see FIG. 1). Also, a pair of weld nuts 24 for fastening a seatback frame 32 that will be described later are provided on a seat width direction inside surface of an upper end portion of the upper arm 22. The weld nuts 24 are arranged with an axial direction being the seat width direction, and lined up in the seat front-back direction. Moreover, an arm flange portion 26 is integrally formed on an outer peripheral portion, except for the upper end portion, of the upper arm 22. This arm flange portion 26 is bent towards the seat width direction inside.

As shown in FIG. 2, the seatback 30 is provided upright on a rear end portion of the seat cushion 12. As shown in FIG. 3, the seatback frame 32 that forms the frame of the seatback 30 is provided inside the seatback 30. The seatback frame 32 is made of resin material (such as carbon fiber reinforced plastic) and is formed as a shell type frame (i.e., a type of frame that is formed in an overall plate shape, and that forms a so-called shell shape that is open toward the seat front side). Also, a seatback pad 64 (see FIG. 2) made of foam material such as urethane is provided on the seat front side of the seatback frame 32. The seatback pad 64 is covered by a cover 66 (see FIG. 2).

The seatback frame 32 includes a back surface panel portion 34 that forms a center portion of the seatback frame 32, an upper frame portion 36 that forms an upper portion of the seatback frame 32, and a pair of side frame portions 38 that form portions on both sides in the seat width direction of the seatback frame 32.

The back surface panel portion 34 is formed in a generally rectangular plate shape with the length direction being the seat vertical direction, and is arranged with the plate thickness direction being substantially the seat front-back direction. Also, although not shown, the back surface panel portion 34 is curved so as to protrude toward the seat rear side in a top sectional view viewed from the seat upper side.

The upper frame portion 36 is formed in a generally inverted L-shaped plate shape in a side view, and is joined to an upper end portion of the back surface panel portion 34. More specifically, the upper frame portion 36 extends toward the seat upper side from the upper end portion of the back surface panel portion 34, and an upper end portion of the upper frame portion 36 curves toward the seat rear side.

The side frame portions 38 are each formed in a generally long plate shape with the seat vertical direction being the length direction, and extend toward the seat front side from end portions on both sides in the seat width direction of the back surface panel portion 34, with the plate thickness direction being substantially the seat width direction. Also, upper portions of the side frame portions 38 curve gently so as to connect with the portions on both sides in the seat width direction of the upper frame portion 36.

Also, a frame flange portion 40 as a flange portion is integrally formed on an outer peripheral portion of the seatback frame 32. This frame flange portion 40 extends from a lower end of one of the side frame portions 38 to a lower end of the other side frame portion 38 along an outer peripheral portion of the seatback frame 32. Also, a portion of the frame flange portion 40 that is formed on a lower end of the side frame portions 38 is a lower flange portion 40A. This lower flange portion 40A protrudes out toward the seat width direction outside from the side frame portions 38, with the plate thickness direction being substantially the seat vertical direction.

A lower end portion of each side frame portion 38 is arranged on the seat width direction outside of the upper arm 22 described above, and opposes an upper portion of the upper arm 22. Also, as shown in FIG. 1, a circular insertion hole 42 is formed through in the seat width direction, in a position on the seat upper side of the lower flange portion 40A, in the lower end portion of the side frame portion 38. This insertion hole 42 is formed in two locations in the side frame portion 38 corresponding to the weld nuts 24, and is arranged on the same axis as the weld nuts 24.

Also, a metal patch 44 as a restricting member is provided on the seat width direction outside surface of the lower end portion of the side frame portion 38. This patch 44 is formed in a generally L-shaped plate shape when viewed from the seat front side, and has a patch main body portion 46 arranged parallel to the side frame portion 38. The patch main body portion 46 is adhered by an adhesive 62 to the seat width direction outside surface of the side frame portion 38.

A pair of metal collars 50 are integrally provided on the patch main body portion 46 (see FIG. 2). Each of these collars 50 is formed in a generally cylindrical shape, and is arranged with the axial direction being the plate thickness direction of the patch main body portion 46, and is joined to the patch main body portion 46 at an axially intermediate portion of the collar 50. That is, the collar 50 is integrally joined to the patch 44 in a state with a seat width direction outside end portion and a seat width direction inside end portion of the collar 50 protruding from the patch main body portion 46.

Also, a collar flange portion 52 is integrally formed on the seat width direction outside end portion of the collar 50. The collar flange portion 52 is formed in a generally annular shape, and protrudes from the collar 50 toward the radially outer side of the collar 50. Also, a seat width direction inside surface of the collar flange portion 52 abuts against a seat width direction outside surface of the patch main body portion 46. Meanwhile, the seat width direction inside end portion of the collar 50 is arranged within the insertion hole 42 of the seatback frame 32, and an end surface on the seat width direction inside of the collar 50 abuts against a seat width direction outside surface of the upper arm 22. A gap G is formed between an outer peripheral portion of the collar 50 and an inner peripheral portion of the insertion hole 42.

Further, a bolt 60 that serves as a fastening member is inserted from the seat width direction outside into an inner peripheral portion of the collar 50. This bolt 60 is made of metal and is formed as a so-called stepped bolt. This bolt 60 has a head portion 60A, a circular cylindrical shaped step portion 60B that forms an axially intermediate portion of the bolt 60, and a screw portion 60C that forms a tip end portion of the bolt 60. The step portion 60B of the bolt 60 is inserted into, the collar 50, and the screw portion 60C of the bolt 60 is screwed into the weld nut 24.

As a result, the side frame portion 38 (i.e., the seatback frame 32) is fastened to the upper arm 22 by being sandwiched by the collar 50 (i.e., the collar flange portion 52) and the patch 44, and the upper arm 22. In this state, the end surface on the seat width direction outside of the collar 50 closely contacts the head portion 60A of the bolt 60.

Also, an outer diameter dimension of the step portion 60B of the bolt 60 is set slightly smaller than an inner diameter dimension of the inner peripheral portion of the collar 50. In other words, the step portion 60B of the bolt 60 is inserted into the collar 50 with almost no gap between the step portion 60B of the bolt 60 and the inner peripheral portion of the collar 50. As a result, relative movement of the collar 50 (i.e., the patch 44) with respect to the bolt 60 is restricted. That is, the amount of relative movement of the collar 50 (i.e., the patch 44) with respect to the bolt 60 is set smaller than the amount of relative movement of the seatback frame 32 with respect to the bolt 60.

Also, a patch flange portion 48 that serves as a restricting portion is formed on a lower end portion of the patch 44. The patch flange portion 48 is curved toward the seat width direction outside from a lower end of the patch main body portion 46, and is arranged opposing the lower flange portion 40A on the seat upper side of the lower flange portion 40A. Also, the lower flange portion 40A is adhered to the patch flange portion 48 by the adhesive 62 described above.

Meanwhile, a pair of support brackets 70 are fixed to the upper frame portion 36 of the seatback frame 32, as shown in FIG. 3. Each of these support brackets 70 is formed in a generally rectangular cylindrical shape, and is arranged with a length direction being the seat vertical direction. Also, generally cylindrical headrest supports, not shown, are retained in the support brackets 70, with stays 74 (see FIG. 2) that protrude from a headrest 72 toward the seat lower side inserted into the headrest supports. As a result, the headrest 72 is fixed to (i.e., supported by) the seatback frame 32 via the stays 74, the headrest supports, and the support brackets 70.

Next, the operation and effects of this example embodiment will be described.

With the vehicle seat 10 to which the seatback frame structure S that is structured in this way is applied, the seatback frame 32 is fastened by the bolt 60 to the upper arm 22 that is joined to the reclining mechanism 18. Also, when the vehicle is involved in a rear collision, the upper body of the seated occupant P moves toward the seat rear side by inertia force (see the arrow in FIG. 2), and as a result, a load toward the seat rear side is input from the seated occupant P to the seatback frame 32. When the load toward the seat rear side is input to the seatback frame 32, the seatback frame 32 tries to fall at a downward angle toward the rear of the seat. If the load input to the seatback frame 32 is greater than the fastening force by the bolt 60 between the seatback frame 32 and the upper arm 22, the seatback frame 32 will try to move relative to the upper arm 22. That is, the lower flange portion 40A of the seatback frame 32 will try to move toward the seat upper side with respect to the upper arm 22.

Here, the patch 44 is provided on the seat width direction inside of the side frame portion 38 of the seatback frame 32, and the collar 50 is integrally provided on the patch 44. Also, the step portion 60B of the bolt 60 is inserted into the collar 50, so relative movement of the collar 50 (i.e., the patch 44) with respect to the bolt 60 is restricted. Furthermore, the screw portion 60C of the bolt 60 is screwed into the weld nut 24, so the bolt 60 is integrally joined to the upper arm 22 via the weld nut 24. As a result, relative movement of the collar 50 (i.e., the patch 44) with respect to the upper arm 22 is restricted.

Also, the patch flange portion 48 is formed on the lower end portion of the patch 44, and the patch flange portion 48 is arranged opposing the lower flange portion 40A on the seat upper side of the lower flange portion 40A.

When the lower flange portion 40A of the seatback frame 32 tries to move toward the seat upper side relative to the upper arm 22, the patch flange portion 48 acts to receive the lower flange portion 40A because relative movement of the collar 50 (i.e., the patch 44) with respect to the upper arm 22 is restricted. As a result, relative movement of the seatback frame 32 with respect to the upper arm 22 is restricted by the patch 44, so the load input to the seatback frame 32 is input to the patch 44. Therefore, concentration of a load input to the seatback frame 32 when the vehicle is involved in a rear collision, at the fastening portion of the seatback frame 32 to which the upper arm 22 is fastened is able to be reduced.

That is, if the patch flange portion 48 of the patch 44 were to be omitted, the inner peripheral surface of the insertion hole 42 of the seatback frame 32 would abut against the outer peripheral surface of the collar 50 when the seatback frame 32 moves relative to the upper arm 22 when the vehicle is involved in a rear collision. As a result, the load input to the seatback frame 32 would concentrate at the inner peripheral portion of the insertion hole 42.

In contrast, with this example embodiment, when the seatback frame 32 moves relative to the upper arm 22 when the vehicle is involved in a rear collision, relative movement of the lower flange portion 40A with respect to the upper arm 22 is restricted by the patch flange portion 48 of the patch 44, as described above. As a result, the load that is input to the seatback frame 32 is input to the patch 44, so the load that is input to the inner peripheral portion of the insertion hole 42 is able to be reduced. Accordingly, concentration of the load input to the seatback frame 32 when the vehicle is involved in a rear collision, at the fastening portion of the seatback frame 32 to which the upper arm 22 is fastened is able to be reduced.

Also, the metal collar 50 is integrally provided on the patch 44 as described above. By fastening the collar 50 to the upper arm 22 with the bolt 60, the seatback frame 32 is fixed to the upper arm 22 in a state sandwiched by the collar 50 and the patch 44, and the upper arm 22. As a result, the seatback frame 32 is fastened to the upper arm 22 by the bolt 60 with the head portion 60A of the bolt 60 and the seat width direction outside end surface of the collar 50 in a metal touch state. Therefore, even if the seatback frame 32 that is made of resin is fastened to the upper arm 22, sufficient axial force by the bolt 60 is able to be ensured.

Moreover, the frame flange portion 40 is formed on an outer peripheral portion of the seatback frame 32, and the patch flange portion 48 is arranged opposing the lower flange portion 40A that forms a portion of the frame flange portion 40. When the seatback frame 32 tries to move relative to the upper arm 22 when the vehicle is involved in a rear collision, relative movement of the lower flange portion 40A with respect to the upper arm 22 is restricted by the patch flange portion 48. As a result, the load input to the seatback frame 32 is able to be transmitted to the patch flange portion 48 using a portion of the seatback frame 32 that has relatively high strength.

Also, the patch flange portion 48 is adhered to the lower flange portion 40A by the adhesive 62. Therefore, a load input to the seatback frame 32 when the vehicle is involved in a rear collision is able to be better transmitted from the lower flange portion 40A to the patch 44 (i.e., the patch flange portion 48).

Furthermore, as described above, the patch flange portion 48 is formed on the patch 44, so a load input to the seatback frame 32 is able to be transmitted to the patch flange portion 48. As a result, the adhesiveness between the patch 44 (i.e., the patch main body portion 46) and the seatback frame 32 (i.e., the side frame portion 38) by the adhesive 62 is able to be improved compared to when the patch flange portion 48 on the patch 44 is omitted.

That is, as shown in FIG. 1, when an impact load input to the side frame portion 38 when the vehicle is involved in a rear collision is denoted F1, the adhesive force of the adhesive 62 between the patch main body portion 46 and the side frame portion 38 is denoted F2, the load input from the lower flange portion 40A to the patch flange portion 48 is denoted F3, and the reaction force acting on the collar 50 (i.e., the patch 44) from the bolt 60 is F4, then from the balance of the forces, F1+F2+F3=F4. Therefore, the adhesive force between the patch main body portion 46 and the side frame portion 38 in this example embodiment may be expressed by F2=F4−F1−F3.

On the other hand, in a comparative example in which the patch flange portion 48 on the patch 44 is omitted, the load F3 that is input from the inclined portion 44A to the patch flange portion 48 described above is not applied. Therefore, the adhesive force between the patch main body portion 46 and the side frame portion 38 in the comparative example is F2'=F4−F1. Accordingly, the adhesive force between the patch main body portion 46 and the side frame portion 38 needs to be higher in the comparative example than it does in the example embodiment. In other words, the adhesive force F2 in the example embodiment is able to be set lower than the adhesive force F2' in the comparative example. As a result, the adhesiveness by the adhesive 62 between the patch 44 and the seatback frame 32 is able to be improved compared to the comparative example described above.

In the example embodiment, the collar 50 is integrally provided on the patch 44, but the collar 50 on the patch 44 may also be omitted. In this case, an insertion hole into which the step portion 60B of the bolt 60 is inserted may be formed in the patch 44, such that relative movement of the patch 44 with respect to the bolt 60 is restricted.

Furthermore, in the example embodiment, the adhesive 62 is interposed between the patch 44 and the side frame portion 38, but the adhesive 62 may also be omitted. In this case, the patch flange portion 48 may abut against the lower flange portion 40A, for example.

Also, in the example embodiment, the outer diameter dimension of the step portion 60B of the bolt 60 is set slightly smaller than the inner diameter dimension of the collar 50, such that relative movement of the patch 44 with respect to the bolt 60 is restricted. Instead, however, a screw portion may be formed on an inner peripheral portion of the collar 50, and a screw portion that screws together with the collar 50 may be formed on an outer peripheral portion of the step portion 60B of the bolt 60. As a result, the patch 44 is integrally joined to the bolt 60 via the collar 50, so relative movement of the patch 44 with respect to the bolt 60 is able to be restricted.

The invention claimed is:

1. A seatback frame structure comprising:
   a reclining mechanism;
   a joining member that is joined to the reclining mechanism;
   a fastening member;
   a seatback frame that forms a frame of a seatback that can support a back of a seated occupant, the seatback frame being fastened to the joining member by the fastening member; and
   a restricting member that includes a metal collar and a restricting portion, the metal collar and the restricting portion being fastened, together with the seatback frame, to the joining member by the fastening member, the metal collar and the restricting portion being configured to restrict relative movement of the seatback frame with respect to the joining member when a vehicle is involved in a rear collision,
   wherein
   the metal collar extends through the restricting member and the seatback frame,
   the seatback frame is made of resin,
   the fastening member engages the restricting member on a laterally outer surface of the seatback frame in a width direction, and
   the seatback frame is fixed in a state sandwiched by the restricting member and the joining member.

2. The seatback frame structure according to claim 1, wherein
   the metal collar is integrally provided on the restricting member.

3. The seatback frame structure according to claim 2, wherein
   the seatback frame includes a flange portion on an outer peripheral portion of the seatback frame;
   a portion of the flange portion is arranged opposing the restricting portion; and
   the restricting portion restricts relative movement of the flange portion with respect to the joining member when the vehicle is involved in the rear collision.

4. The seatback frame structure according to claim 1, wherein
the restricting portion is adhered to the seatback frame by an adhesive.

* * * * *